United States Patent [19]

Shima

[11] Patent Number: 5,350,036

[45] Date of Patent: Sep. 27, 1994

[54] DEADMAN BRAKE ASSEMBLY FOR CARGO VEHICLES

[75] Inventor: Hideaki Shima, Kariya, Japan

[73] Assignee: Kabushiki Kaisha Toyoda Jidoshokki Seisakusho, Kariya, Japan

[21] Appl. No.: 895,100

[22] Filed: Jun. 8, 1992

[30] Foreign Application Priority Data

Jun. 12, 1991 [JP] Japan .................. 3-140196

[51] Int. Cl.⁵ .............................................. B60K 28/04
[52] U.S. Cl. .................... 180/273; 180/275; 188/109
[58] Field of Search ............... 180/273, 275; 188/109; 267/171; 303/19

[56] References Cited

U.S. PATENT DOCUMENTS

| 2,708,005 | 5/1955 | Gazzo | 180/273 |
| 2,734,740 | 2/1956 | Morris | 267/171 |
| 3,259,203 | 7/1966 | Ryskamp | 188/109 |
| 3,664,454 | 5/1972 | Cottrell | 180/273 |
| 3,749,207 | 7/1973 | Meyer et al. | 180/273 |
| 3,787,086 | 1/1974 | Cosby | 180/273 |

FOREIGN PATENT DOCUMENTS 47-40631 12/1972 Japan .
48-53437 7/1973 Japan .

Primary Examiner—Margaret A. Focarino
Assistant Examiner—Paul Dickson
Attorney, Agent, or Firm—Brooks Haidt Haffner & Delahunty

[57] ABSTRACT

A deadman brake assembly incorporating a turnover spring in a link mechanism thereof to exert a spring force in a direction in which a seat supporting plate is kept in a state it enters when a driver sits on the driver's seat and to exert the spring force in another direction in which the seat supporting plate is lifted when the driver leaves the driver's seat, suppressing as much as possible the lifting force acting on the driver's seat when the driver sits thereon.

6 Claims, 5 Drawing Sheets

DEADMAN BRAKE ASSEMBLY FOR CARGO VEHICLES

BACKGROUND OF THE INVENTION

1. Field of the Invention

The present invention relates to cargo vehicles such as fork lift trucks. More particularly, it relates to a deadman brake assembly which automatically works when the driver is not on his seat.

2. Description of the Prior Art

FIG. 5 shows a typical conventional deadman brake provided on a cargo vehicle such as a fork lift truck. As illustrated, the deadman brake assembly comprises a seat supporting plate 2 for supporting a driver's seat 1 and a brake bar 4 of a drum type brake device 3 connected by a link mechanism 5. When the driver is not on the driver's seat 1, the seat supporting plate 2 pivoted on a bracket 7 of a vehicle frame 6 is tilted forward (the direction of the arrow A) as a result of the action of a tension spring 8, and a brake shoe 9 sandwiches a brake drum 10 on both sides thereof to exert a braking action on the brake drum 10. When the driver sits on the driver's seat 1, the seat supporting plate 2 is tilted against the spring force of the tension spring 8 to the position indicated by the dotted chain line so that the brake drum 10 is released from the state in which it is sandwiched by the brake shoe 9.

As will be apparent from the above, in the deadman brake, the driver's seat 1 always has a tendency to tilt forward as a result of the action of the tension spring 8. However, since the tension spring 8 has a maximum tensile force when the driver sits on the driver's seat 1, the lifting force exerted on the driver's seat when the driver sits on the seat is greater than that exerted when the seat is not occupied. This has resulted in problems that, even when the driver sits on the driver's seat, the seat can be shaky during driving depending on the posture of the driver and the driver can have a sense of floating.

SUMMARY OF THE INVENTION

It is therefore a major object of the present invention to provide a deadman brake assembly which can reduce the lifting force exerted on a driver's seat as much as possible when a driver sits on the seat.

In order to achieve the above object, the deadman brake for a cargo vehicle having a vehicle frame and a driver's seat according to the present invention comprises a brake device selectively applying a braking force to said cargo vehicle, means provided for moving between a brake releasing position that the moving means assumes when a driver sits on said driver's seat and a brake applying position that the moving means assumes when the driver is not on said seat, a link mechanism interposed between said moving means and said brake device for connecting them and for effecting the release or application of the brake with said brake device in response to the movement of said moving means, first means connected to said link mechanism for urging said moving means toward said brake applying position through said link mechanism, and second means connected to said link mechanism for urging said moving means toward said brake releasing position through said link mechanism when a driver sits on said driver's seat.

According to a preferred embodiment of the present invention, a deadman brake comprising a seat supporting plate for supporting a driver's seat, which is mounted so that it can be tilted relative to a vehicle frame, a brake device, a link mechanism for connecting said seat supporting plate and a brake lever of said brake device, and a spring means provided in said link mechanism for urging said brake lever in the direction in which the brake is applied is characterised in that said link mechanism incorporates a turnover spring which exerts a spring force in a direction for keeping said seat supporting plate in a state that it enters when the driver sits on said driver's seat and which exerts a spring force in another direction for lifting said seat supporting plate when the driver leaves said driver's seat.

By incorporating the turnover spring as described above, a component of the spring force of said spring means is cancelled when the driver sits on the seat and, as a result, the lifting force acting on the seat supporting plate is reduced.

BRIEF DESCRIPTION OF THE DRAWINGS

The present invention will be more readily understood by reading the following detailed description of the preferred embodiment thereof made in conjunction with the accompanying drawings, wherein.

DESCRIPTION OF THE PREFERRED EMBODIMENT

Figure 1:
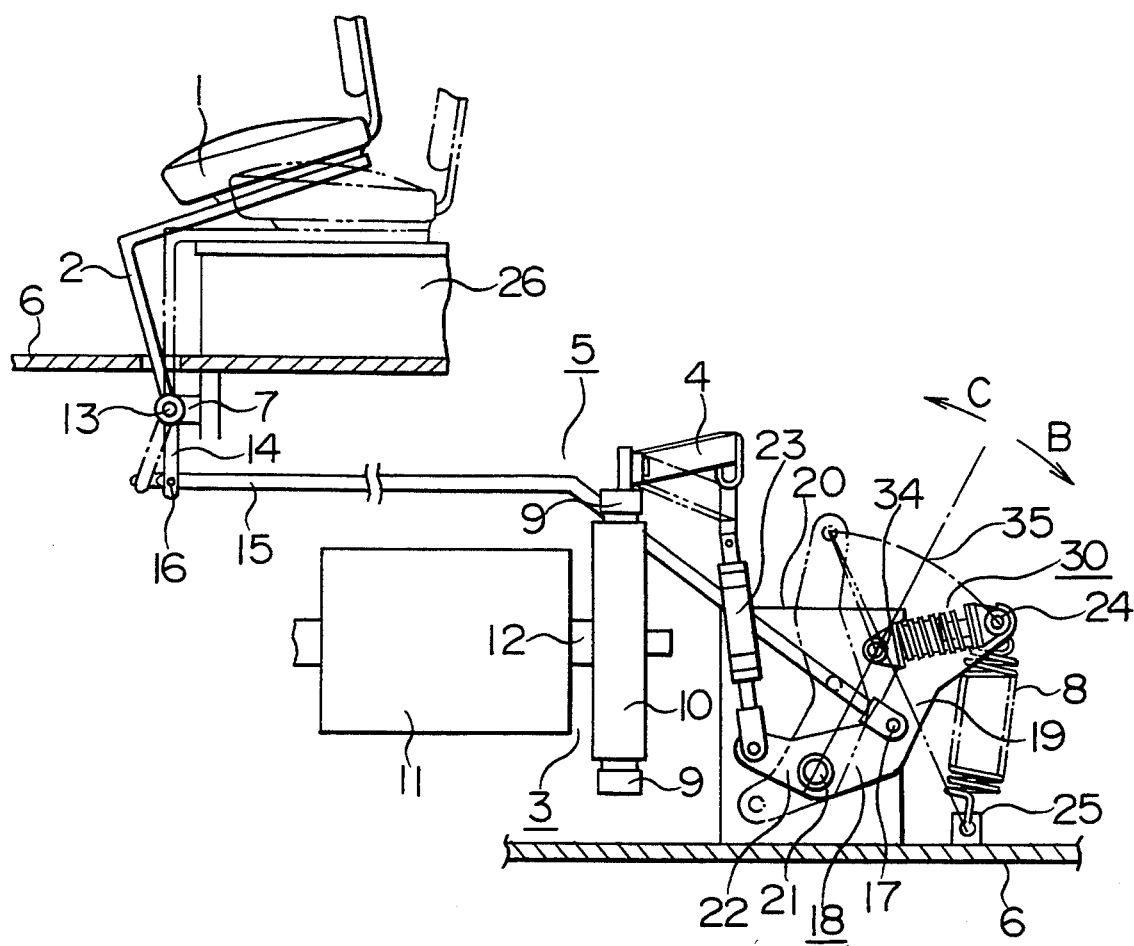
FIG. 1 is a schematic side view showing a deadman brake assembly according to the present invention as a whole.

A preferred embodiment of the present invention will now be described in detail with reference to the accompanying drawings. Throughout the drawings, like reference numerals indicate like or corresponding parts.

Figure 5:
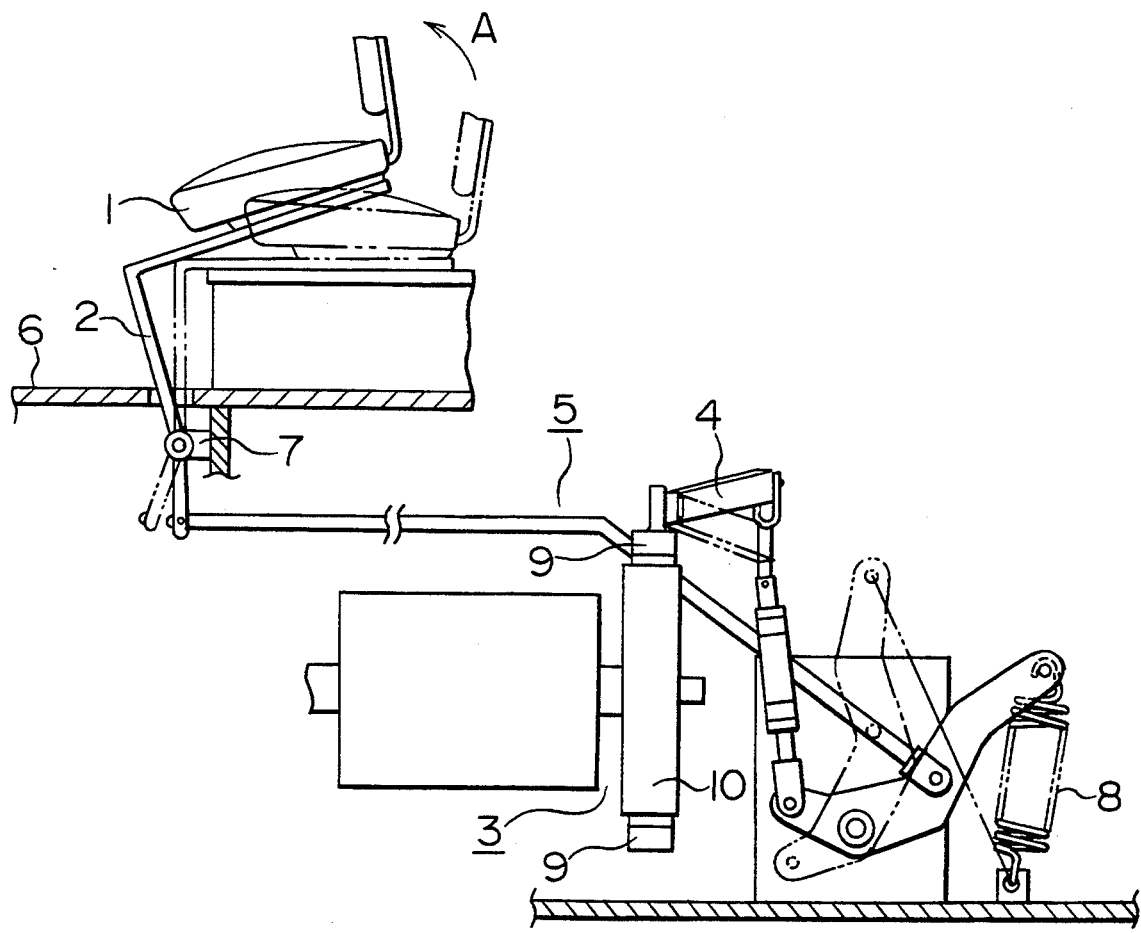
FIG. 5 is a schematic side view showing a conventional deadman brake as a whole.

FIG. 1 schematically shows an embodiment of a deadman brake assembly configured according to the present invention. The deadman brake assembly of the present invention has a seat supporting plate 2 formed in a curved L-like shape for supporting a driver's seat 1, a drum type brake device 3 for braking a rotating shaft 12 of a drive motor 11 as needed, and a link mechanism 5 interposed between them for connecting them, just as in the conventional deadman brake described above in conjunction with FIG. 5.

The lower end of the seat supporting plate 2 is supported on a bracket 7 provided under a vehicle frame 6 with a pin 13 so that it can be tilted forward and backward together with the driver's seat 1. One piece of seat supporting plate 2 forms a link 14 extending downwardly from the lower end of the seat supporting plate 2 so that it will swing forward and backward about the pin 13 in response to the movement of the seat supporting plate 2.

One end of a connecting rod 15 is connected to the end the link 14 by a pin 16 to allow the link 14 to swing.

The other end of the connecting rod 15 is connected to an intermediate portion of a long arm 19 of a bell crank 18 by a pin 17. The bell crank 18 is pivoted on a support bracket 20 secured to the vehicle frame 6 by a shaft 21. The end of a short arm 22 of the bell crank 18 is connected to the end of a brake lever 4 of the brake device 3 through a connecting rod 23.

Figure 2:
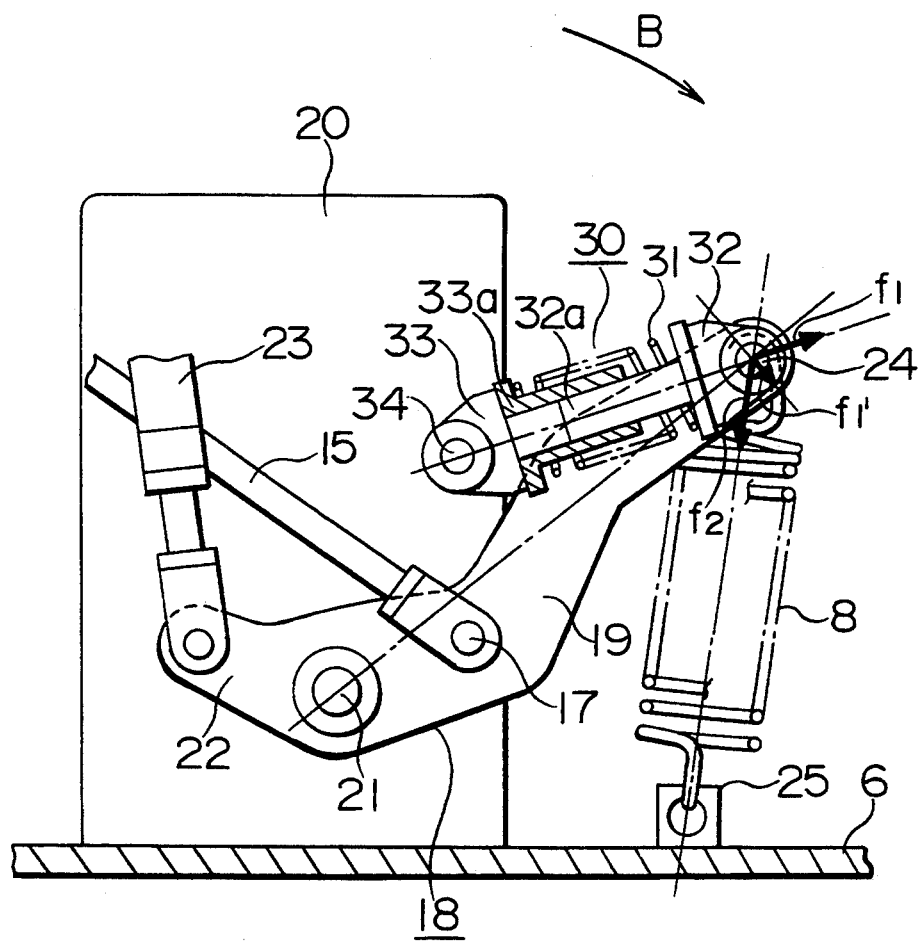
FIG. 2 is an enlarged partially cut-away view of a part of FIG. 1 showing a state wherein the seat is not occupied (brake applied) for illustrating the action of a turnover spring in a deadman brake of the present invention.
Figure 3:
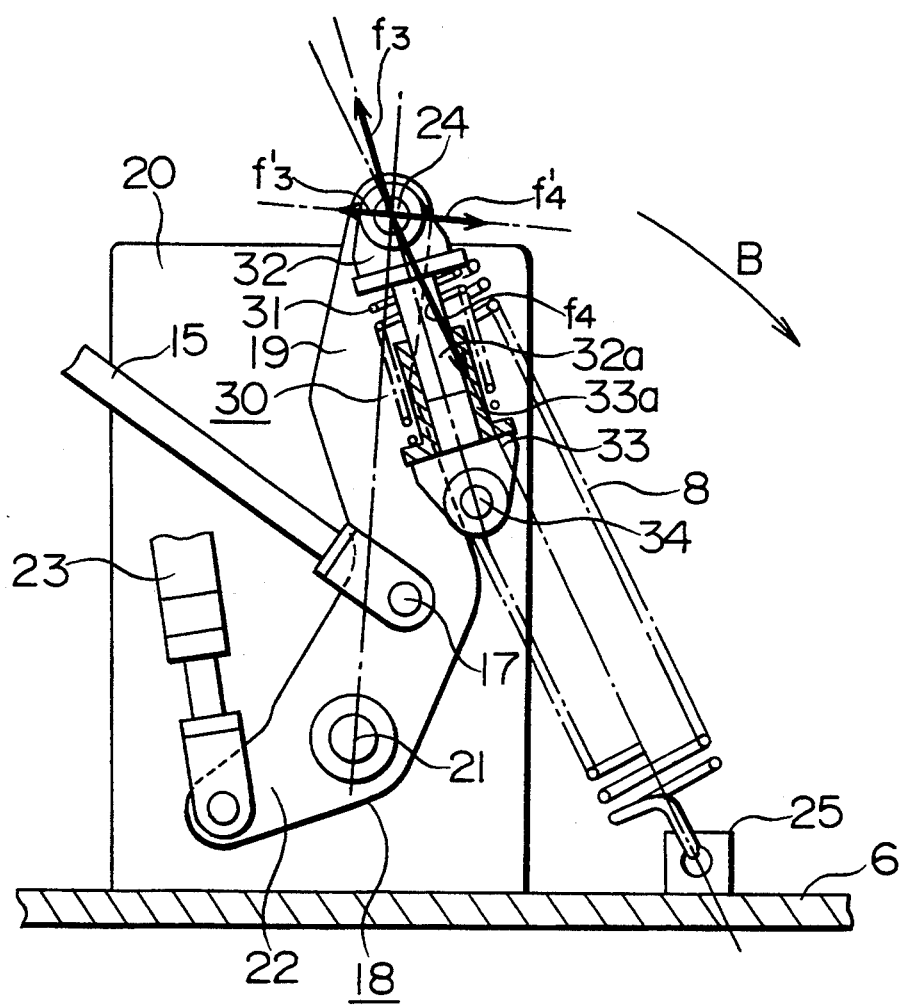
FIG. 3 is an enlarged view similar to FIG. 2 showing a state wherein the seat is occupied (brake released)

As will be apparent from FIGS. 2 and 3, a support pin 24 is attached to the end of the long arm 19 of the bell crank 18, and one end of a tension coil spring 8 engages with the support pin 24. The other end of the tension spring 8 is attached to a support piece 25 on the vehicle frame 6. In a no-load condition, the tension spring 8 causes the bell crank 18 to rotate to the position indicated by a solid line in FIG. 1 (the state shown in FIG. 2), causes the brake lever 4 to tilt in a direction such that the brake shoe 9 will sandwich the brake drum 10, and causes the seat supporting plate 2 and driver's seat 1 to incline through the connecting rod 15 and link 14 so that they will float above a support base 26.

In the illustrated embodiment of the present invention, a turnover spring assembly 30 is interposed between the support pin 24 of the long arm 19 of the bell crank 18 and the support bracket 20. The turnover spring assembly 30 comprises a compression coil spring 31, and retaining members 32 and 33 provided in a sliding relationship with each other so that they will sandwich said compression coil spring 31 on both sides thereof. The first retaining member 32 having a shaft portion 32a is pivoted on the support pin 24, and the second retaining member 33 having a cylindrical portion 33a slidably receiving said shaft portion 32a is pivoted on a support shaft 34 on the support bracket 20. As shown in FIG. 1, the support shaft 34 is centered on the line connecting a point 35 which is substantially in the middle of the locus that the center of the support pin 24 on said bell crank describes when the bell crank 18 rotates from the position indicated by the solid line to the position indicated by the dotted line and the center of the shaft 21 pivotally supporting the bell crank 18. In addition, the center of the support shaft 34 is in a position such that the compresion coil spring 31 is compressed to the extreme when the support pin 24 is on the point 35.

In such a configuration, when the driver is not on the driver's seat 1 the bell crank 18 is pulled in the direction of the arrow B by the tension spring 8. Therefore, the seat supporting plate 2 and driver's seat 1 are kept in a floating state through the connecting rod 15 and link 14 and the brake shoe 9 of the brake device 3 sandwiches the brake drum 10 to exert a braking force on the rotating shaft 12 of the drive motor 11. At this time, the turnover spring assembly 30 exerts an urging force $f_1$ on the support pin 24 as shown in FIG. 2. A component force $f_1'$ of the urging force $f_1$ in a direction tangential to said locus of the support pin 24 acts downwardly to urge the bell crank 18 in the direction of the arrow B. This force, along with the tensile force $f_2$ of the tension spring 8, exerts a large downward torque on the bell crank 18.

On the other hand, when the driver sits on the driver's seat 1, the seat supporting plate 2 rotates backward (clockwise in FIG. 1) about the pin 13, and the link 14 and connecting rod 15 move forward to rotate the bell crank 18 in the direction of the arrow C. Thus, the state as indicated by the dotted chain line in FIG. 1 and shown in FIG. 3 is realized. In this state, the brake lever 4 of the brake device 3 is pulled down through the connecting rod 23 as a result of the operation of the bell crank 18. This separates the brake shoe 9 from the brake drum 10 to release the brake. In the period of time immediately after the seat is occupied, the compression spring 31 of the turnover spring assembly 30 is gradually compressed as the bell crank 18 is rotated and enters a state wherein it is compressed to the extreme at the point 35. If the bell crank 18 is further rotated, the direction in which the spring force of the turnover spring assembly 30 acts changes to the direction in which the bell crank 18 is urged in the direction of the arrow C. Finally, the state shown in FIG. 3 is realized. In this state, in a direction tangential to said locus of the support pin 24, a component force $f_3'$ of the spring force $f_3$ of the turnover spring assembly 30 acts in the direction opposite to that of a component force $f_4'$ of the tensile force $f_4$ of the tension spring 8. Thus, the torque that the bell crank 18 receives is reduced compared with that in the case where the turnover spring assembly 30 is not provided. Accordingly, the lifting force exerted on the driver's seat 1 by the bell crank 18 through the connecting rod 15, link 14 and seat supporting plate 3 is also suppressed.

Figure 4:
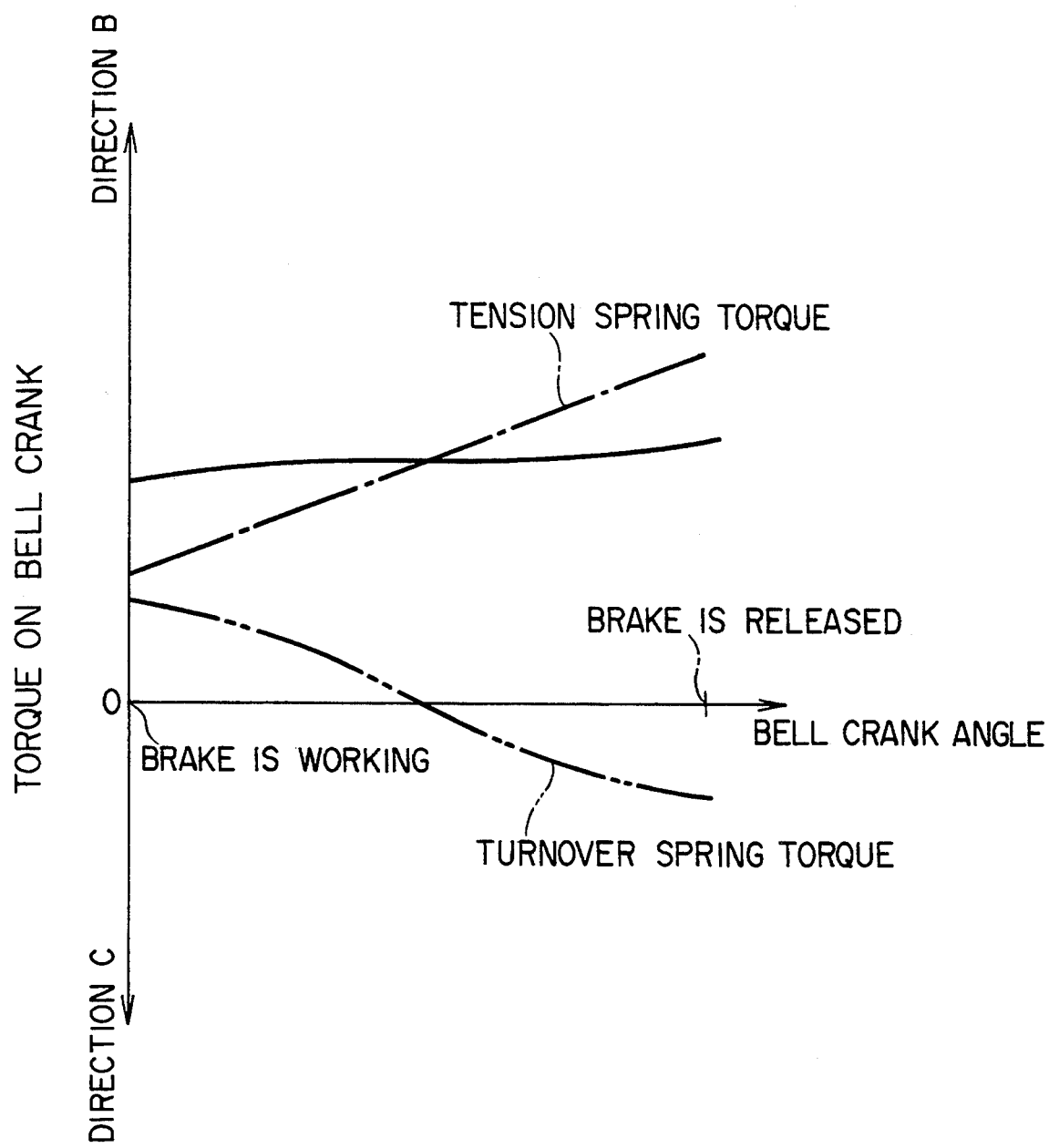
FIG. 4 is a graph showing the relationship between the torque action on a bell crank in a deadman brake assembly of the present invention and the position of said bell crank.

FIG. 4 is a graph showing the relationship between the position of the bell crank 18 (the angle thereof relative to the position at the time when the brake is actuated) and the torque acting on the bell crank 18. It will be understood also from this figure that the torque acting on the bell crank 18, i.e., the lifting force acting on the driver's seat 1 is fixed by providing the turnover spring assembly 30.

In light of the function of the turnover spring assembly 30, the torque acting on the bell crank 18 must always be in the direction of the arrow B. Therefore, the torque provided when the turnover spring assembly 30 is in the state shown in FIG. 3 must be smaller than the torque provided by the tension spring 8.

As described above, in the deadman brake according to the present invention, the lifting force acting on the driver's seat when the drive sits on the seat is suppressed. This results in improved stability preventing the driver's seat from being shaky during driving and suppresses the feeling of floating allowing more comfortable driving.

Further, when the seat is not occupied, the turnover spring as well as the tension spring cause the brake lever of the brake device to tilt in the same direction. As a result, a more reliable brake operation can be performed.

In the drawings and description, there has been disclosed a typical preferred embodiment of the invention and, although specific terms are employed, they are used in a generic and descriptive sense only, and not for purposes of limitation. Numerous variations can be made within the spirit and scope of the invention as described in the foregoing description and defined in the appended claims. For example, although the turnover spring assembly is mounted on the bell crank in the above-described embodiment, the mounting position may be appropriately changed depending on the configuration of the link mechanism. Further, the turnover spring assembly is not limited to the compression spring type, and those comprising a torsion coil spring, tension spring, or the like may be used.

I claim:

1. A deadman brake assembly for a cargo vehicle having a vehicle frame and a driver's seat, comprising a brake device for selectively applying a braking force to said cargo vehicle, moving means provided for moving said brake device between a brake release position in response to a driver sitting on said driver's seat and a normal brake application position when a driver is not on said seat; a link mechanism interconnecting said moving means and said brake device for effecting movement of said brake device between said brake release and brake application positions in response to movement of said moving means; first urging means connected to said link mechanism normally urging said moving means toward said brake application position; second urging means connected to said link mechanism for urging said moving means toward said brake release position when a driver sits on said driver's seat; and third urging means connected to said link mechanism for urging said moving means toward said brake application position independently of said first urging means; said link mechanism comprising a bell crank having a long arm and a short arm swingably mounted on said vehicle frame by a first mounting means; said first, second and third urging means being mounted on the end of said long arm by a second mounting means; one end of said link mechanism being connected in the middle of said long arm; a brake lever of said brake device being connected to the end of said short arm; said first urging means comprising a coil spring connected to said vehicle frame on one end thereof and connected to the end of said long arm on the outer end thereof; said second and third urging means including a turnover spring mounted on said vehicle frame by a third mounting means on one end thereof and connected to the end of said long arm on the other end thereof; and said third mounting means of said turnover spring being within the swinging range of said bell crank which swings from a first position to a second position as said moving means moves from said brake application position to said brake release position.

2. A deadman brake assembly according to claim 1, wherein said turnover spring is a compression coil spring.

3. A deadman brake assembly according to claim 2, wherein the center of said third mounting means is in a position which is on a line connecting a point substantially in the middle of a locus of points that the center of said second mounting means of said bell crank describes when said bell crank swings from said first position to said second position and the center of said first mounting means of said bell crank, and such that said compression coil spring is maximally compressed when said second mounting means is one said middle point.

4. A deadman brake assembly according to claim 3, wherein component forces, in directions tangential to said locus of points, of an urging force exerted by said turnover spring on said second mounting means act in a direction in which said bell crank is urged toward said first position when the center of said second mounting means is between said middle point and a point corresponding to said first position of said bell crank, and act in a direction in which said bell crank is urged toward said second position when the center of said second mounting means is between said middle point and a point corresponding to said second position of said bell crank.

5. A deadman brake assembly for a cargo vehicle having a frame and a driver's seat, comprising a brake device for selectively applying a brake force to said cargo vehicle, said brake device being movable between a brake application position and a brake release position; a seat supporting plate for supporting said driver's seat, said plate being tiltably mounted for movement between an upper position thereof when said seat is unoccupied and a lower position thereof in response to a driver sitting in said seat, said upper position corresponding to said brake application position of said brake device and said lower position corresponding to said brake release position of said brake device; and a link mechanism interconnecting said seat supporting plate and said brake device and comprising a bell crank, a shaft on said frame mounting said bell crank for pivotal movement, said bell crank having a first arm and a second arm movable together during said pivotal movement of said bell crank, a tension spring connected between said bell crank first arm and said frame and urging said bell crank to a first position, said bell crank second arm being connected to said brake device whereby said brake device is in said brake application position when said bell crank is in said first position, link rod means between said driver's seat supporting plate and said bell crank whereby said seat is in said upper position when said bell crank is in said first position responsive to said urging of said tension spring and said bell crank is pivoted to a second position responsive to said seat being moved to said lower position, said brake device being in said brake release position when said bell crank is in said second position, and a compression turnover spring having a first end pivotally connected to said frame and a second end connected to said bell crank to exert urging force reinforcing said urging of said tension spring when said bell crank is in said first position and to exert urging force which partially counteracts said urging of said tension spring when said bell crank is pivoted to said second position.

6. A deadman brake assembly according to claim 5, wherein said turnover spring first end is pivotally connected to said frame at a location on an imaginary line extending between said bell crank shaft and a point located at a middle location on an imaginary arc of said pivotal movement of said bell crank between said first and second positions of said first arm.

* * * * *

UNITED STATES PATENT AND TRADEMARK OFFICE
CERTIFICATE OF CORRECTION

PATENT NO. : 5,350,036
DATED : September 27, 1994
INVENTOR(S) : H. Shima et al

It is certified that error appears in the above-indentified patent and that said Letters Patent is hereby corrected as shown below:

Col. 1, line 50, "selectively" should read --for selectively--.

Column 2, line 68, after "end" insert --of--.

Column 5, line 50, "one" should read --on--.

Signed and Sealed this

Fourth Day of April, 1995

BRUCE LEHMAN

Attest:

Attesting Officer

Commissioner of Patents and Trademarks